(12) United States Patent
Onkarachari

(10) Patent No.: US 11,280,559 B2
(45) Date of Patent: Mar. 22, 2022

(54) DUMBBELL SHAPED PLATE FIN

(71) Applicant: Hanon Systems, Daejeon (KR)

(72) Inventor: Sunil Kumar Harihar Onkarachari, Karnataka (IN)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 16/872,560

(22) Filed: May 12, 2020

(65) Prior Publication Data

US 2021/0356218 A1 Nov. 18, 2021

(51) Int. Cl.
*F01N 5/02* (2006.01)
*F28F 3/04* (2006.01)
*F02M 26/29* (2016.01)

(52) U.S. Cl.
CPC ............. *F28F 3/042* (2013.01); *F02M 26/29* (2016.02); *F28F 3/046* (2013.01)

(58) Field of Classification Search
CPC .. F28F 3/042; F28F 3/046; F28F 3/048; F28F 3/02; F02M 26/29
USPC .......................................................... 165/51
See application file for complete search history.

(56) References Cited

U.S. PATENT DOCUMENTS

| | | | | |
|---|---|---|---|---|
| 4,327,802 A * | 5/1982 | Beldam | ................. | F28D 9/0093 165/153 |
| 5,682,948 A * | 11/1997 | Bock | ........................ | F28F 3/02 165/185 |
| 6,220,340 B1 * | 4/2001 | Cheong | ................. | F28D 1/0333 165/103 |
| 6,247,523 B1 * | 6/2001 | Shibagaki | ............. | F28D 9/0043 165/51 |
| 6,250,380 B1 * | 6/2001 | Strahle | .................. | F28D 9/0043 165/167 |
| 6,293,337 B1 * | 9/2001 | Strahle | .................. | F28D 9/0037 165/166 |
| 6,585,151 B1 * | 7/2003 | Ghosh | ..................... | F42D 5/045 228/260 |
| 7,681,629 B2 * | 3/2010 | Yamaguchi | ........... | F28D 9/0037 165/166 |
| 9,103,250 B2 * | 8/2015 | Iwasaki | .................... | F28F 3/027 |
| 9,863,716 B2 * | 1/2018 | Kokas | ................. | F28D 15/0275 |
| 10,378,487 B2 * | 8/2019 | Yoon | ...................... | F02M 26/32 |

(Continued)

FOREIGN PATENT DOCUMENTS

| | | |
|---|---|---|
| JP | 2004293988 A | 10/2004 |
| KR | 101608149 B1 | 3/2016 |
| KR | 20170029309 A | 3/2017 |

*Primary Examiner* — Claire E Rojohn, III
(74) *Attorney, Agent, or Firm* — Shumaker, Loop & Kendrick, LLP; James D. Miller

(57) ABSTRACT

A heat exchanger element for use in a heat exchanger includes an outer wall formed into a tubular shape including a first portion and a second portion. The first portion is arranged parallel to and is spaced apart from the second portion. A plurality of fin structures extends between the first portion and the second portion of the outer wall. Each of the fin structures defines a flow channel configured to provide fluid communication between an outer surface of the first portion of the outer wall and an outer surface of the second portion of the outer wall. An interior of the outer wall is configured to receive a first fluid while an exterior of the outer wall and each of the flow channels defined by the fin structures are configured to receive a second fluid in heat exchange relationship with the first fluid.

17 Claims, 7 Drawing Sheets

(56) References Cited

U.S. PATENT DOCUMENTS

| | | | |
|---|---|---|---|
| 10,809,009 B2* | 10/2020 | Schouten | F28F 9/22 |
| 2004/0134640 A1* | 7/2004 | Sakakibara | F28F 1/02 |
| | | | 165/103 |
| 2004/0226706 A1* | 11/2004 | Zurawel | F28D 1/0333 |
| | | | 165/177 |
| 2008/0011464 A1* | 1/2008 | Oofune | F02M 26/38 |
| | | | 165/157 |
| 2008/0164014 A1* | 7/2008 | Nakamura | F02M 26/32 |
| | | | 165/165 |
| 2010/0095659 A1* | 4/2010 | Kuroyanagi | F02B 29/0418 |
| | | | 60/320 |
| 2011/0185714 A1* | 8/2011 | Lohbreyer | F28F 9/26 |
| | | | 60/320 |
| 2013/0240195 A1* | 9/2013 | Chen | F28F 3/12 |
| | | | 165/185 |
| 2020/0309071 A1* | 10/2020 | Onkarachari | F02M 26/32 |

* cited by examiner

DUMBBELL SHAPED PLATE FIN

TECHNICAL FIELD

The invention concerns a heat exchanger, and more specifically, a heat exchanger element of the heat exchanger having an outer wall formed into a tubular shape and a plurality of fin structures extending between opposing portions of the outer wall. The tubular shape of the outer wall forms a hollow space for receiving a first fluid while a plurality of flow channels defined by each of the fin structures form a plurality of hollow spaces for receiving a second fluid in heat exchange relationship with the first fluid.

BACKGROUND

Systems for exhaust gas recirculation in motor vehicles are known from the prior art, with which the nitrogen oxides in the exhaust gases of motor vehicles, especially in the exhaust gases of diesel-operated motor vehicles, are reduced and the fuel consumption of gasoline-operated motor vehicles is decreased. In the exhaust gas recirculation systems of this kind, cooled or non-cooled exhaust gas is mixed in with the fresh air taken in by the engine.

During combustion at high temperatures, environmentally harmful nitrogen oxides are produced in the engine of motor vehicles, especially when using lean fuel mixtures, that is, in the partial load range. In order to decrease the emission of nitrogen oxides, a lowering of the high temperature peaks and a decreasing of the excess air during combustion is necessary. Thanks to the lower oxygen concentration of the fuel and air mixture, a rate of the combustion process and thus the maximum combustion temperatures are reduced. Both effects are accomplished by mixing in a partial flow of exhaust gas in the fresh air flow taken in by the engine.

In diesel-operated motor vehicles, an exhaust gas recirculation system accomplishes a decrease in noise emissions in addition to the lowering of the oxygen fraction and the temperature peaks during the combustion. In gasoline-operated motor vehicles with an exhaust gas recirculation system, the throttling losses are furthermore decreased.

However, the mixing in of the recirculated exhaust gas flow with high temperatures reduces the cooling effect of the exhaust gas recirculation on the combustion. Furthermore, a mixture of air and exhaust with high temperatures that is aspirated by the engine has negative impact on the cylinder filling and thus on the power density of the engine. In order to counteract the negative effects, prior to the mixing the exhaust gas is cooled down in a heat exchanger, the so-called exhaust gas heat exchanger or exhaust gas recirculation cooler.

Various designs of exhaust gas heat exchangers are known from the prior art. However, increasingly strict legislation regarding exhaust gas standards and fuel consumption requirements for motor vehicles are making necessary an increased need for cooling with ever smaller footprint of the components in the motor vehicle. These contrary requirements are seldom fulfilled by the known exhaust gas heat exchangers.

It is accordingly desirable to produce an improved exhaust gas heat exchanger having increased heat transfer efficiency.

SUMMARY OF THE INVENTION

In accordance and attuned with the present invention, an improved exhaust gas heat exchanger having increased heat exchange efficiency has surprisingly been discovered.

According to an embodiment of the disclosure, a heat exchanger element for use in a heat exchanger includes an outer wall formed into a tubular shape including a first portion and a second portion. The first portion is arranged parallel to and is spaced apart from the second portion. A plurality of fin structures extends between the first portion and the second portion of the outer wall. Each of the fin structures defines a flow channel therethrough configured to provide fluid communication between an outer surface of the first portion of the outer wall and an outer surface of the second portion of the outer wall. An interior of the outer wall is configured to receive a first fluid while an exterior of the outer wall and each of the flow channels defined by the fin structures are configured to receive a second fluid in heat exchange relationship with the first fluid.

According to another embodiment of the invention, a heat exchanger is disclosed. The heat exchanger includes a housing configured to delimit the flow of a first fluid and a plurality of heat exchangers elements disposed within the housing. Each of the heat exchanger elements includes an outer wall formed into a tubular shape configured to receive a second fluid therethrough. The outer wall includes a first portion arranged parallel to and spaced apart from a second portion. A plurality of fin structures extends between the first portion and the second portion of the outer wall. Each of the fin structures defines a flow channel therethrough configured to receive a flow of the first fluid.

DESCRIPTION OF THE DRAWINGS

Further details, features and advantages of the invention will emerge from the following specification of sample embodiments making reference to the accompanying drawings.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner.

As used herein, references to direct fluid communication between two fluid conveying structures indicates that the fluid passes directly from a first fluid conveying structure into a second fluid conveying structure without passing through any intervening fluid conveying structures. For example, direct fluid communication may be provided when a fluid passes through or over a boundary formed between the two fluid conveying structures, such as when passing through an opening formed in one of the fluid conveying structures.

In contrast, references to indirect fluid communication between two fluid conveying structures indicates that the fluid passes through at least a third intervening fluid conveying structure when passing from the first fluid conveying structure to the second fluid conveying structure. For example, the fluid may pass through a connecting pipe or conduit disposed between the first fluid conveying structure and the second fluid conveying structure, wherein the connecting pipe or conduit may be referred to as providing the indirect fluid communication between the first and second fluid conveying structures.

Additionally, references to an intervening fluid conveying structure or a boundary between a first fluid conveying structure and a second fluid conveying structure providing fluid communication between the first and second fluid conveying structures indicates that the fluid is able to pass through the intervening fluid conveying structure or the boundary when passing between the first and second fluid conveying structures, as opposed to requiring an alternative flow path not including the intervening fluid conveying structure or the boundary between the first and second fluid conveying structures. Additionally, references to a third and intervening fluid conveying structure providing direct fluid communication between a first fluid conveying structure and a second fluid conveying structure indicates that the third and intervening fluid conveying structure is the only fluid conveying structure through which the fluid passes when traveling from the first fluid conveying structure to the second fluid conveying structure, hence additional intervening fluid conveying structures are not disposed between the third and intervening fluid conveying structure and either of the first fluid conveying structure or the second fluid conveying structure.

Figure 1:
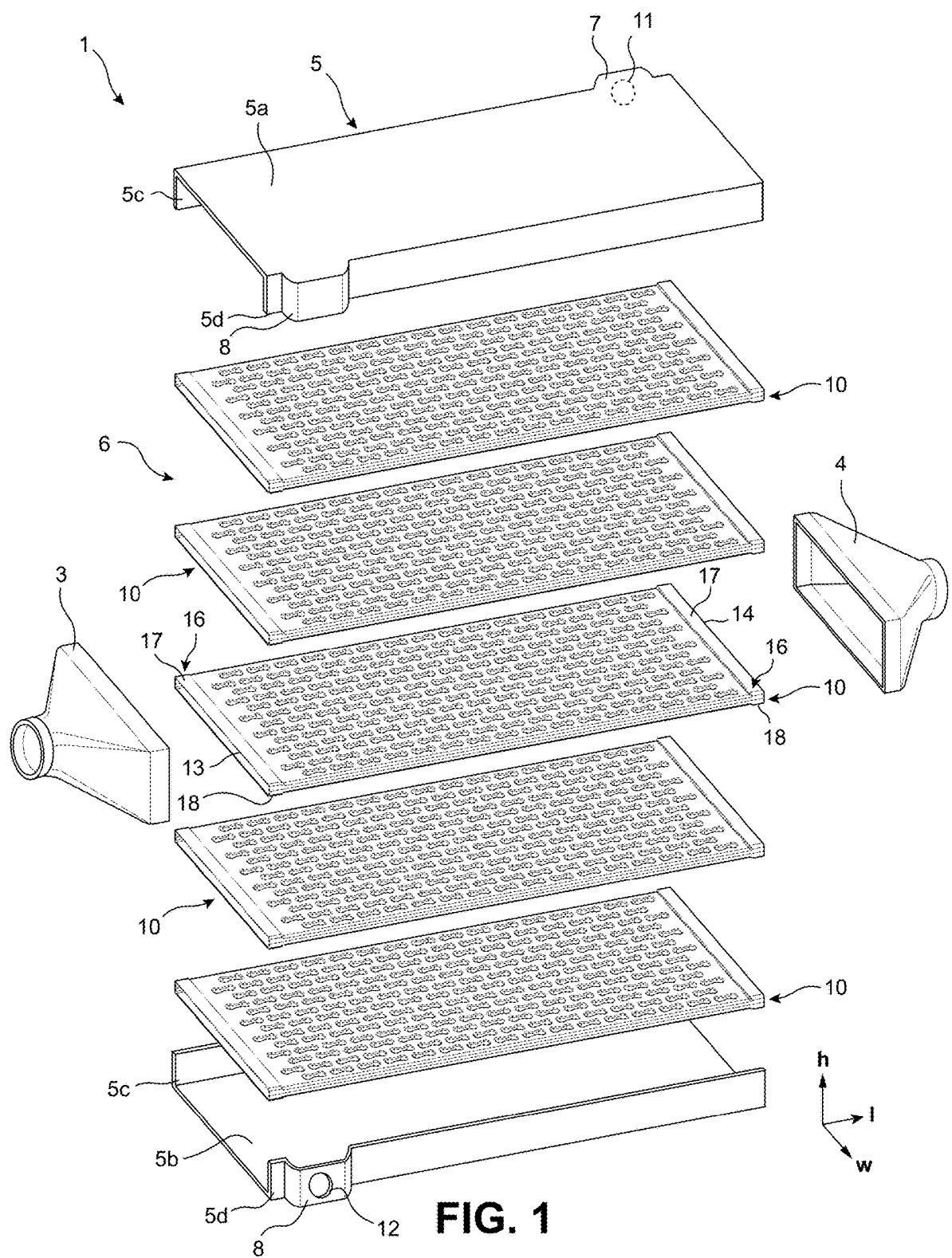
FIG. 1 is an exploded perspective view of a heat exchanger according to an embodiment of the present invention.

FIG. 1 illustrates a heat exchanger 1 according to an embodiment of the present invention. The heat exchanger 1 may be provided as an exhaust gas cooler for use with an internal combustion engine of a motor vehicle, as one non-limiting example. However, it is readily apparent to one skilled in the art that the heat exchanger 1 may be adapted for use in any application requiring the exchange of heat between two independently provided fluids, as desired. Although any combination of fluids may be used, including any combination of gases, liquids, or mixtures thereof, the heat exchanger 1 is described herein as being in fluid communication with each of a flow of a gaseous exhaust gas exiting the internal combustion engine and a flow of a liquid coolant circulated through a coolant circuit (not shown) including the heat exchanger 1. The liquid coolant may be water, glycol, and mixtures thereof, as non-limiting examples.

The heat exchanger 1 generally includes an inlet adapter 3, an outlet adapter 4, and a core housing 5 encapsulating a heat exchanger core 6 of the heat exchanger 1, wherein the heat exchanger core 6 refers to a portion of the heat exchanger 1 wherein heat exchange is carried out between the flow of the exhaust gas and the flow of the coolant. The heat exchanger core 6 is comprised of a stack of heat exchanger elements 10 with each of the heat exchanger elements 10 including independently provided flow paths for the exhaust gas and the coolant to flow through when transferring heat with each other within the heat exchanger core 6. The heat exchanger 1 and the heat exchanger elements 10 are described throughout the present patent application relative to a longitudinal direction, a width direction arranged perpendicular to the longitudinal direction (also referred to as a lateral direction), and a height direction arranged perpendicular to each of the longitudinal direction and the width direction. These directions are clearly indicated by the reference axes included in each of the figures of the present patent application, wherein the references axes are labeled as l, w, and h throughout.

The inlet adapter 3 and the outlet adapter 4 each include a transition from a substantially circular cross-sectional shape at one end thereof to a substantially rectangular cross-sectional shape at an opposing end thereof. The circular cross-sectioned portion of the inlet adapter 3 is configured to be coupled to a first exhaust gas line (not shown) associated with conveying exhaust gases from the internal combustion engine to the heat exchanger 1 while the rectangular cross-sectioned portion of the inlet adapter 3 is configured for coupling to an end of the core housing 5 as well as an end of the heat exchanger core 6. The rectangular cross-sectioned portion of the outlet adapter 4 is similarly coupled to an opposing end of the core housing 5 as well as an end of the heat exchanger core 6 while the circular cross-sectioned portion of the outlet adapter 4 is configured for coupling to a second exhaust gas line (not shown) associated with directing the exhaust gases away from the heat exchanger 1 after having flowed therethrough.

The core housing 5 is substantially rectangular cuboid in shape with a rectangular cross-section substantially corresponding to the rectangular cross-sectioned portion of each of the adapters 3, 4. The core housing 5 includes a first wall 5a, a second wall 5b arranged parallel to and opposite the first wall 5a, a third wall 5c connecting the first wall 5a to the second wall 5b at one side of the core housing 5, and a fourth wall 5d arranged parallel to and opposite the third wall 5c while also connecting the first wall 5a to the second wall 5b at an opposing side of the core housing 5. In the provided embodiment, the core housing 5 is formed from two shells that meet along the third and fourth walls 5c, 5d at a seam spaced from each of the first wall 5a and the second wall 5b, but any number of walls or shells may be combined to form the core housing 5 without departing from the scope of the present invention.

The third wall 5c includes an inlet opening 11 formed therein adjacent the end of the core housing 5 coupled to the outlet adapter 4 and the fourth wall 5d includes an outlet opening 12 formed therein adjacent the end of the core housing 5 coupled to the inlet adapter 3. The inlet opening 11 is configured for coupling to a first coolant line (not shown) for conveying the coolant to the heat exchanger 1 while the outlet opening 12 is configured for coupling to a second coolant line (not shown) for conveying the coolant away from the heat exchanger 1. In the provided embodiment, the inlet opening 11 is shown as being formed at a higher position on the core housing 5 with respect to the height direction of the heat exchanger 1 than is the outlet opening 12 to allow for the force of gravity to aid in pressurizing the coolant flow through the heat exchanger 1. However, alternative positions of the inlet opening 11 and the outlet opening 12 may be utilized without departing from the scope of the present invention so long as the coolant is sufficiently pressurized by the corresponding coolant system for causing the coolant to flow through the heat exchanger 1 in the desired manner. For example, the opening 12 may alternatively form an inlet into the core housing 5 while the opening 11 may form an outlet out of the core housing 5, wherein the coolant entering the core housing 5 through the opening 12 is pressurized to progressively fill the interior of the core housing 5 until the coolant can flow out of the higher arranged opening 11.

The inlet opening 11 is shown as being formed in an outwardly projecting portion 7 of the third wall 5c while the outlet opening 12 is shown as being formed in an outwardly projecting portion 8 of the fourth wall 5d. The projecting portions 7, 8 space the inlet opening 11 and the outlet opening 12 from the outer side surfaces of the heat exchanger core 6 in order to form manifold chambers to each side thereof, wherein each of the manifold chambers is able to distribute the coolant to or recombine the coolant from the spaces present between adjacent ones of the heat exchanger elements 10, as described in greater detail hereinafter. The openings 11, 12 are also shown as being formed in the lateral portions of the projecting portions 7, 8, but may alternatively be formed in the upper or lower surfaces of the projecting portions 7, 8 corresponding to the upper and lower walls 5a, 5b.

In other embodiments, the entirety of the third wall 5c is spaced outwardly from a first side surface of the heat exchanger core 6 and an entirety of the fourth wall 5d is spaced outwardly from a second side surface of the heat exchanger core 6 in order to increase a length of each of the associated manifold chambers, as desired. One skilled in the art should appreciate that alternative configurations of the core housing 5 may be utilized without necessarily departing from the scope of the present invention, as desired.

The heat exchanger core 6 is formed by stacking a plurality of the heat exchanger elements 10 in the height direction thereof to form a substantially rectangular cuboid shape corresponding to that of the core housing 5. Each of the heat exchanger elements 10 forms a tubular shape that is extended longitudinally from an inlet end 13 to an outlet end 14. The exhaust gas is accordingly configured to flow through a hollow interior of each of the heat exchanger elements 10 while flowing in a longitudinal direction thereof extending from the inlet end 13 to the outlet end 14 of each of the heat exchanger elements 10.

Figure 3:
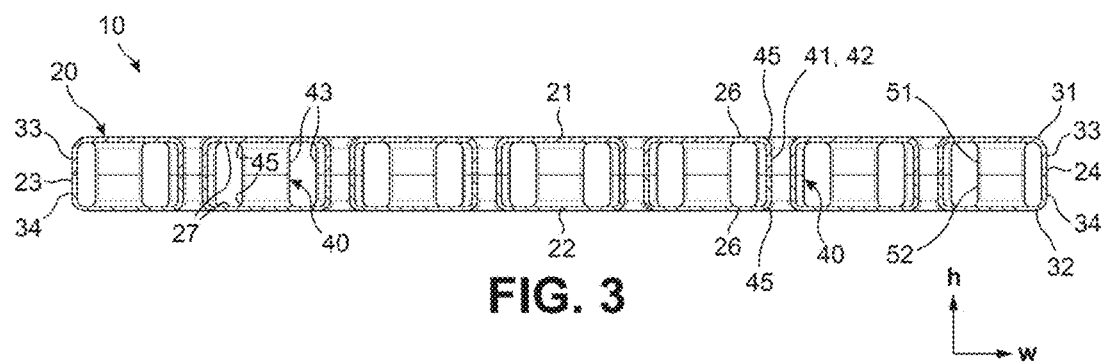
FIG. 3 is a cross-sectional elevational view of the heat exchanger element as taken through section lines 3-3 of FIG. 2.

As best shown in FIG. 3, the tubular shape of each of the heat exchanger elements 10 is formed by an outer wall 20 comprising a first portion 21, a second portion 22 arranged opposite the first portion 21 and spaced therefrom with respect to the height direction of the heat exchanger element 10, a third portion 23 connecting the first portion 21 to the second portion 22 at one lateral side of each of the heat exchanger elements 10, and a fourth portion 24 connecting the first portion 21 to the second portion 22 at the other lateral side of each of the heat exchanger elements 10. The first portion 21 and the second portion 22 are each substantially planar and arranged parallel to each other.

Figure 2:
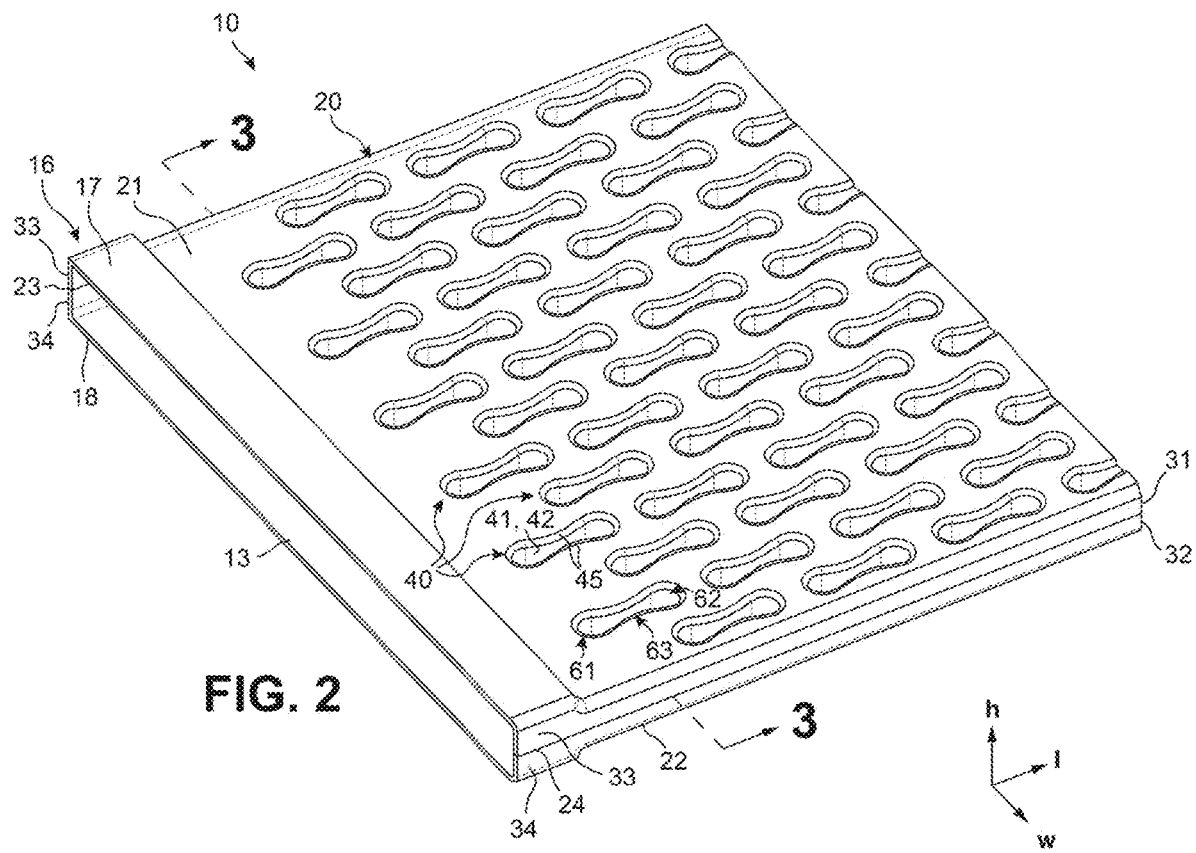
FIG. 2 is an enlarged fragmentary perspective view of a heat exchanger element of the heat exchanger of FIG. 1 shown in isolation.

In the provided embodiment, each of the heat exchanger elements 10 is formed by coupling a first plate element 31 to a second plate element 32. The first plate element 31 forms the first portion 21 of the outer wall 20 and includes inwardly projecting first wall segments 33 along each of the lateral sides thereof for partially forming each of the third portion 23 and the fourth portion 24 of the outer wall 20. The second plate element 32 forms the second portion 22 of the outer wall 20 and includes inwardly projecting second wall segments 34 along each of the lateral sides thereof for also partially forming each of the third portion 23 and the fourth portion 24 of the outer wall 20. The end surfaces of the first wall segment 33 may be engaged directly with the end surfaces of the second wall segments 34 along a central dividing seam formed between the plate elements 31, 32 as illustrated in FIGS. 1-3, whereby the outer wall 20 is formed in equal part by the first plate element 31 and the second plate element 32.

Alternatively, the first wall segments 33 may be overlapped with the second wall segments 34 by any given distance with respect to the height direction of the heat exchanger elements 10 in order to increase the surface area of the engagement between the first plate element 31 and the second plate element 32. Such a configuration would accordingly include the wall segments 33, 34 extending a distance beyond half a distance present between the first and second portions 21, 22 of the outer wall 20 in order to form the described overlap, in contrast to the illustrated configuration of FIGS. 1-3 wherein each of the wall segments 33, 34 projects a distance equal to half the distance present between the first portion 21 and the second portion 22 of the outer wall 20.

The tubular shape of each of the heat exchanger elements 10 is expanded with respect to the height direction at each of the inlet end 13 and the outlet end 14 of each of the heat exchanger elements 10, thereby forming a coupling feature 16 at each of the opposing ends 13, 14 of each of the heat exchanger elements 10. Specifically, each of the coupling features 16 includes a first coupling surface 17 arranged parallel to the first portion 21 while spaced outwardly therefrom with respect to the height direction as well a second coupling surface 18 arranged parallel to the second portion 22 while spaced outwardly therefrom with respect to the height direction. The outward expansion of each of the heat exchanger elements 10 at each of the ends 13, 14 thereof allows for the first portion 21 of the outer wall 20 of one of the heat exchanger elements 10 to be spaced apart from the second portion 22 of the outer wall 20 of an adjacent one of the heat exchanger elements 10 to allow coolant to flow therebetween when the heat exchanger elements 10 are coupled to each other. In the provided embodiment, the spaces formed between adjacent ones of the heat exchanger elements 10 are placed in fluid communication with each of the inlet opening 11 and the outlet opening 12 at each of the outwardly projecting portions 7, 8 of the core housing 5, but alternative flow configurations may be utilized without departing from the scope of the present invention as described in greater detail hereinafter.

The outward expansion and coupling of the ends 13, 14 of each of the heat exchanger elements 10 also allows for the heat exchanger elements 10 to be stacked in a manner wherein the coupled together inlet ends 13 occupy the entirety of the rectangular cross-sectional shape of the inlet adapter 3 while the coupled together outlet ends 14 occupy the entirety of the rectangular cross-sectional shape of the outlet adapter 4. The inlet adapter 3 and the outlet adapter 4 are accordingly coupled to the heat exchanger core 6 and the core housing 5 in a manner wherein the exhaust gas flows into the inlet ends 13 at one end face of the heat exchange core 6 and out of the outlet ends 14 at another end face of the heat exchanger core 6 without introducing the exhaust gas into the portions of the core housing 5 surrounding the heat exchanger core 6 and configured for delimiting the flow of the coolant therein.

Referring to FIGS. 2 and 3, a portion of one of the heat exchanger elements 10 is shown in isolation to better illustrate the novel features thereof as described hereinafter. The heat exchanger element 10 includes a plurality of fin structures 40 formed therein, wherein each of the fin structures 40 is provided as a thin-walled and tubular structure extending between and connecting the first portion 21 and the second portion 22 of the outer wall 20. Each of the fin structures 40 includes an inner surface 41 defining a flow channel 42 therethrough for receiving the coolant as well as an outer surface 43 exposed to the exhaust gas flowing through the hollow interior of the outer wall 20. The fin structures 40 accordingly form a heat exchanging structure for exchanging heat between the exhaust gas and the liquid coolant, each of which are capable of flowing through the heat exchanger element 10.

In the illustrated embodiment, each of the fin structures 40 is formed by the cooperation of a first projecting rim 51 projecting inwardly from the first plate element 31 and a second projecting rim 52 projecting inwardly from the second plate element 32, wherein the projecting rims 51, 52 meet at a central seam of the heat exchanger element 10 disposed an equal distance from the first portion 21 and the second portion 22 of the outer wall 20. Each of the projecting rims 51, 52 may be formed by deforming the otherwise planar first and second portions 21, 22 inwardly into the desired cross-sectional shape and to the desired depth, such as by a stamping or punching process performed on each of the plate elements 31, 32.

Each of the flow channels 42 extends in the height direction of the heat exchanger element 10, which is arranged perpendicular to the plane defined by either of the first portion 21 or the second portion 22 of the outer wall 20. Each of the fin structures 40 includes a transition region 45 at each respective end thereof where each of the fin structures 40 merges with the remainder of the otherwise planar first and second portions 21, 22 of the outer wall 20. Each of the transition regions 45 connects an outer surface 26 of the outer wall 20 along one of the first portion 21 or the second portion 22 to the inner surface 41 of a corresponding one of the fin structures 40 defining the flow channel 42 therethrough. Each of the transition regions 45 may alternatively be said to connect an inner surface 27 of the outer wall 20 along one of the first portion 21 or the second portion 22 to the outer surface 43 of a corresponding one of the fin structures 40. Each of the transition regions 45 includes an arcuate curvature as the outer wall 20 is bent away from the plane of the respective portion 21, 22 until pointing inwardly parallel to the height direction of the heat exchanger element 10. The arcuate cross-sectional shape is formed around an entirety of a perimeter of each of the fin structures 40 to ensure a smooth transition from the plane of the corresponding portion 21, 22 of the outer wall 40 to the direction of flow of the coolant through each of the flow channels 42. Such a smooth transition prevents either of the heat exchanging fluids from experiencing an excessive pressure drop when encountering the transition regions 45 from an interior or an exterior of the corresponding heat exchanger element 10.

Each of the fin structures 40 includes a dumb-bell shaped cross-section including a first enlarged portion 61 having a convex outer shape, an oppositely arranged second enlarged portion 62 also having a convex outer shape, and a connecting portion 63 having a diameter smaller than a diameter of the enlarged portions 61, 62 while also having opposing concave outer shapes for connecting the first and second enlarged portions 61, 62. The inner surface 41, the outer surface 43, and the transition region 45 of each of the fin structures 40 all include the same dumb-bell shape along an entirety of a height of each of the fin structures 40 between the first portion 21 and the second portion 22 of the outer wall 20. Each of the fin structures 40 is arranged wherein the longitudinal dimension of the dumb-bell shape is arranged in parallel to the longitudinal direction of the heat exchanger element 10 with the exhaust gases first encountering the portion of the outer wall 43 of each of the fin structures 40 corresponding to the first enlarged portion 61 of the dumb-bell shape.

The dumb-bell shape may be more accurately described as having the shape of a Cassini oval, which is a quartic plane curve defined by a set of points wherein the product of the distance of each of the points forming the curve from each of two fixed points spaced a distance $2a$ apart is a constant value of $b^2$. The perimeter shape of each of the fin structures 40 may be selected to restrict the ratio $b/a$ to values between 1 and $\sqrt{2}$, wherein values of the ratio approaching 1 include a minimized diameter of the connecting portion 63 relative to the adjoining enlarged portions 61, 62 to resemble a figure-8 shape while values approaching $\sqrt{2}$ include a maximized diameter of the connecting portion 63 relative to the adjoining enlarged portions 61, 62 to resemble an elliptical shape with very little concavity on either side of the connecting portion 63.

The dumb-bell shaped cross-section of each of the fin structures 40 includes a greater surface area exposed to each of the heat exchanging fluids than would a similarly dimensioned tubular structure having a purely elliptical or circular cross-section. The concavity of each of the opposing sides of the connecting portion 63 as well as the distance therebetween may accordingly be preselected to prescribe a desired heat exchange efficiency to each of the fin structures 40 based on the resulting surface area of each the fin structures 40 directly exposed to the heat exchanging fluids when passing through the heat exchanger element 10. The concavity and diameter of the connecting portion 63 may also be preselected to prescribe desired flow conditions of the exhaust gas within the hollow interior of the outer wall 20. For example, the degree of concavity of each of the opposing sides of the connecting portions 63 may alter the degree of lateral expansion of the exhaust gas when passing by the first enlarged portion 61 and then the degree of lateral contraction of the exhaust gas when encountering the second enlarged portion 62 of each of the fin structures 40.

The fin structures 40 are arranged into a plurality of rows with each of the rows including a center of each of a plurality of the fin structures 40 disposed on a single line extending in the width direction of the heat exchanger element 10. Each feature of each of the fin structures 40 of one of the rows is spaced from the corresponding feature of each of the fin structures 40 of an adjacent row with respect to the longitudinal direction of the heat exchanger element 10. For example, the first enlarged portion 61 of each of the fin structures 40 of one of the rows is spaced in the longitudinal direction of the heat exchanger element 10 from the first enlarged portion 61 of each of the fin structures 40 of each of the adjacent rows. However, the rows are not entirely spaced from each other with respect to the longitudinal direction of the heat exchanger element 10, but are instead arranged wherein the fin structures 40 of each of the rows are at least partially overlapped with the fin structures 40 of each of the adjacent rows with respect to the longitudinal direction of the heat exchanger element 10. For example, the second enlarged portion 62 of each of the fin structures 40 of the row adjacent the inlet end 13 are aligned and therefore overlapped with the first enlarged portion 61 of each of the fin structures 40 of the adjacent row with respect to the longitudinal direction of the heat exchanger element 10. This overlap also requires the rows to be arranged in an alternating offset arrangement wherein each successive row of the fin structures 40 when progressing in the longitudinal direction of the heat exchanger element 10 is laterally offset from each of the adjacent rows of the fin structures 40 with respect to the width direction of the heat exchanger element 10. This results in the fin structures 40 of each of the odd numbered rows being in alignment with each other with respect to the width direction of the heat exchanger element 10 as well as the fin structures 40 of each of the even numbered rows being in alignment with each other with respect to the width direction of the heat exchanger element 10. The resulting configuration includes each of the fin structures 40 surrounded by six adjacent ones of the fin structures 40 with the six adjacent fin structures 40 arranged into a hexagonal shape.

The disclosed spacing between the fin structures 40 may be altered to further tune the heat exchanger 1 for a specific pressure drop and heat exchange efficiency, as desired. For example, the disclosed overlap present between adjacent rows of the fin structures 40 with respect to the longitudinal direction may be changed or even eliminated if the adjacent rows are spaced from each other sufficiently. Alternatively, the spacing between adjacent ones of the fin structures 40 forming each row may be changed to alter the occurrence of the exhaust gas striking one of the fin structures 40. The amount of offset present between each row of the fin structures 40 with respect to the width direction may also be changed from the that disclosed in FIG. 2 wherein the fin structures 40 of adjacent rows are interposed directly between each other. Lastly, it should be understood that the spacing or offset present in any of the described features may be varied along a length or a width of the heat exchanger element 10 in order to further prescribe the desired flow and heat exchange characteristics of the heat exchanger element 10.

The heat exchanger element 10 is produced by coupling the first plate element 31 to the second plate element 32 at each of the seams formed therebetween. The coupling of the first plate element 31 to the second plate element 32 may be performed via a suitable brazing process, wherein the clad brazing material may be applied to each of the plate elements 31, 32 at suitable positions adjacent each of the engaging surfaces thereof. Such a brazing process forms a fluid tight seal at the intersection of each of the projecting rims 51, 52 forming the fin structures 40 as well as at each of the intersections of the wall segments 33, 34. The symmetry of the heat exchanger element 10 about the central seam wherein the plate elements 31, 32 meet allows for each of the plate elements 31, 32 to be formed identically, thereby significantly reducing the time, cost, and difficulty in manufacturing each of the heat exchanger elements 10. As mentioned hereinabove, the plate elements 31, 32 may be punched or stamped into the illustrated configurations for coupling to each other. However, one skilled in the art should understand that the plate elements 31, 32 may be formed into the illustrated configuration using any suitable manufacturing process, including a molding process or the like. Additionally, any coupling method may be utilized to couple the plate elements 31, 32 to each other in addition to the described brazing process, so long as each of the internal joints or seams formed within the heat exchanger element 10 are able to be sealed in a fluid tight manner.

The heat exchanger 1 operates as follows. The exhaust gas enters the inlet adapter 3 and is distributed into the hollow interior of each of the heat exchanger elements 10 as defined by the inner surface 27 of the outer wall 20 thereof. The exhaust gas flows longitudinally through each of the heat exchanger elements 10 from each of the inlet ends 13 to each of the corresponding outlet ends 14. Concurrently, the coolant is introduced into the core housing 5 through the inlet opening 11 formed adjacent the outlet adapter 4. The coolant is distributed to the spaces formed between the coupled together heat exchanger elements 10 to allow the coolant to encounter each of the first portion 21 of one of the heat exchanger elements 10 and the second portion 22 of an adjacent one of the heat exchanger elements 10 within a first space. The inclusion of one of the flow channels 42 within each of the fin structures 40 further allows for the coolant to flow in the height direction of the heat exchanger element 10 between the spaces formed between adjacent ones of the heat exchanger elements 10. The coolant is accordingly able to flow in each of the width direction and the longitudinal direction of the heat exchanger elements 10 when flowing through the spaces formed between adjacent ones of the heat exchanger elements 10 as well as being able to flow in the height direction of the heat exchanger elements 10 while flowing through the flow channels 42 of the fin structures 40. The different directions of flow of the coolant leads to the coolant having multiple different flow relationships relative to the exhaust gas. Specifically, a portion of the coolant flowing in the longitudinal direction of the heat exchanger elements 10 from the inlet opening 11 towards the outlet opening 12 establishes a counter-flow flow configuration relative to the exhaust gas while the portions of the coolant flowing in the width and height directions of the heat exchanger elements 10 establish a cross-flow configuration relative to the exhaust gas. The exhaust gas and the coolant exchange heat through the outer wall 20 and each of the fin structures 40 in order to cool the exhaust gas in anticipation of mixing the cooled exhaust gas with intake air delivered to the internal combustion engine.

The shape of each of the fin structures 40 as well as the configuration of the array of the fin structures 40 provides numerous benefits over the heat exchanger elements of the prior art. First, the manner in which the fin structures 40 deviate from the otherwise planar first and second portions 21, 22 of the outer wall 20 increases the surface area of the heat exchanger element 10 encountering each of the heat exchanging fluids, thereby improving the heat exchanger efficiency of the heat exchanger 1. Second, the manner in which the coolant is able to be communicated in the height direction of the heat exchanger 1 between adjacent spaces formed between the heat exchanger elements 10 allows for a more homogenous heat distribution within the heat exchanger core 6, which in turn reduces the formation of thermal gradients within the heat exchanger core 6 that can lead to the formation of undesirable stresses therein. Third, the alternatingly offset configuration of the rows of the fin structures 40 causes the exhaust gas to take a serpentine flow path when passing through the heat exchanger elements 10 in the longitudinal direction thereof, which in turn increases the degree of mixing of the exhaust gas within the interior of each of the heat exchanger elements 10. More specifically, the exhaust gas is diverted in the width direction of the heat exchanger elements 10 when encountering the leading surface of the outer surface 43 of each of the fin structures 40 to cause continuous mixing of the exhaust gas when traversing each of the heat exchanger elements 10. Fourth, the unique dumb-bell shape of each of the fin structures 40 further increases the surface area of the portions of the heat exchanger element 10 exposed to the heat exchange fluids in comparison to an otherwise elliptical or circular structure of similar size. Lastly, the manner in which each of the surfaces forming each of the fin structures 40 includes a gradual or curved transition when changing directions prevents the occurrence of an undesired pressure drop in either of the associated heat exchanging fluids.

Figure 4:
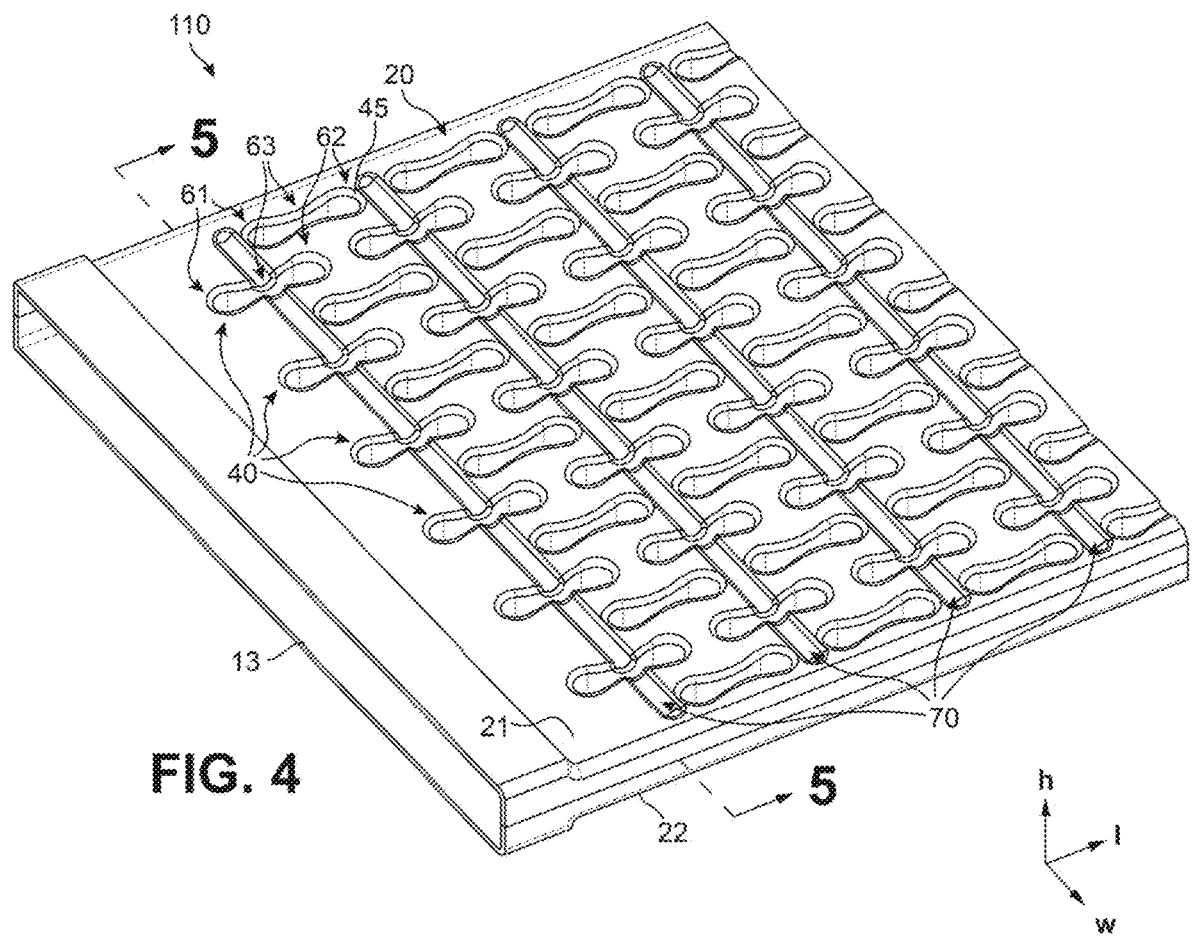
FIG. 4 is an enlarged fragmentary perspective view of a heat exchanger element having an alternating pattern of grooves formed in an outer wall thereof according to another embodiment of the present invention.
Figure 5:
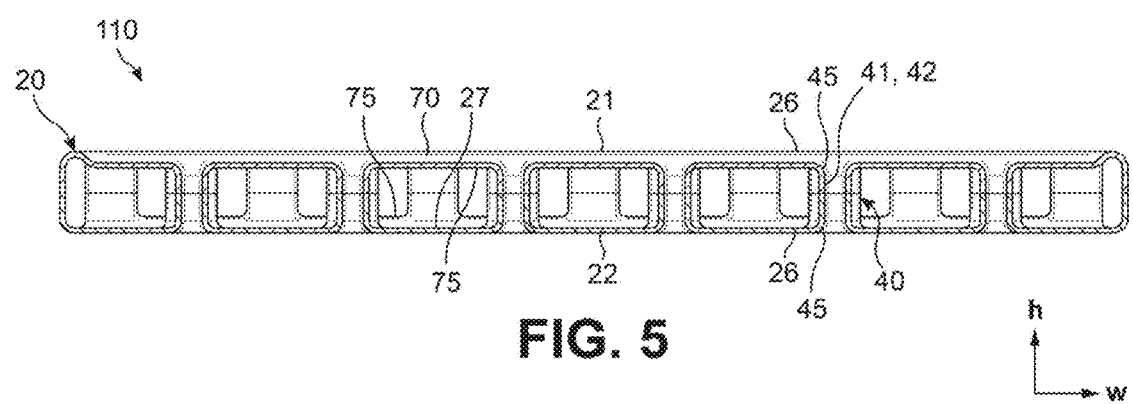
FIG. 5 is a cross-sectional elevational view of the heat exchanger element as taken through section lines 5-5 of FIG. 4.

Referring now to FIGS. 4 and 5, a modified heat exchanger element 110 according to another embodiment of the invention is disclosed. The heat exchanger element 110 is substantially identical to the heat exchanger element 10 with the exception of the introduction of a plurality of grooves 70 into the outer surface 26 of the outer wall 20 which in turn results in the formation of a corresponding plurality of ribs 75 projecting inwardly from the inner surface 27 of the outer wall 20. Each of the grooves/ribs 70, 75 extends longitudinally in the width direction of the heat exchanger element 110 while passing through or intersecting each of the fin structures 40 forming one of the laterally extending rows as explained hereinabove. More specifically, the grooves/ribs 70, 75 are positioned with respect to the longitudinal direction of the heat exchanger element 110 in a manner wherein the grooves/ribs 70, 75 intersect the connecting portion 63 of each of the fin structures 40. The grooves/ribs 70, 75 are also positioned in a manner wherein the enlarged portions 61, 62 of each of the fin structures 40 of each of the adjacent rows are disposed immediately adjacent a perimeter of one of the grooves 70. This results in each end of each of the fin structures 40 devoid of one of the grooves 70 being sandwiched immediately between the grooves 70 associated with two adjacent rows of the fin structures 40 such that the corresponding transition regions 45 are immediately adjacent or touching the perimeter of the surrounding grooves 70.

The inwardly indented portions of the outer surface 26 forming each of the grooves 70 merge with the transition region 45 of each of the fin structures 40 to form a smooth and continuous surface for the coolant to flow along when turning to flow through each of the flow channels 42 formed through the fin structures 40. The outwardly projecting portions of the inner surface 27 of the outer wall 20 forming each of the ribs 75 similarly merge smoothly and continuously at the transition region 45 of each of the fin structures 40 to once again present a smooth and continuous surface for the exhaust gas to encounter when traversing the interior of the outer wall 20.

The grooves/fins 70, 75 are formed in the first portion 21 and the second portion 22 of the outer wall 20 in alternating fashion when progressing from row to row of the fin structures 40 with respect to the longitudinal direction of the heat exchanger element 110. For example, each of the odd numbered rows of the fin structures 40 when starting from the inlet end 13 of the heat exchanger element 110 may include one of the grooves/ribs 70, 75 formed in the first portion 21 of the outer wall 20 while each of the even numbered rows of the fin structures 40 may include one of the grooves/ribs 70, 75 formed in the second portion 22 of the outer wall 20. One of the ribs 75 projecting inwardly from the second portion 22 of the outer wall 20 is depicted in FIG. 3 with respect to the row disposed downstream of the row through which the perspective of FIG. 3 is taken.

The heat exchanger element 110 may be produced in substantially the same manner as the heat exchanger element 10 wherein two substantially identical and opposing plate elements are coupled to each other along the sides thereof as well as at the junction of each of the projecting rims cooperating to form the corresponding fin structures. The grooves/ribs 70, 75 may be introduced into the plate elements during the same manufacturing process used to form the wall elements or the projecting rims thereof, such as a stamping or punching process. The heat exchanger element 110 may similarly be adapted for use with the heat exchanger 1 without altering the remainder of the construction thereof.

The inclusion of the grooves/ribs 70, 75 in the outer wall 20 of the heat exchanger element 110 provides numerous advantageous features. First, the grooves 70 form flow directing features that are able to guide the flow of the coolant in the width direction of the heat exchanger element 110 for more evenly distributing the coolant to each of the flow channels 42 formed through the fin structures 40, thereby aiding in equalizing the heat transfer throughout the heat exchanger core 6. Second, the deformation of the first and second portions 21, 22 to the indented/projected shape when forming the grooves/ribs 70, 75 further increases the surface area of the heat exchanger element 110 exposed to the heat exchanging fluids, thereby improving the heat exchange efficiency of the heat exchanger element 110. Third, the ribs 75 project into the hollow interior formed by the outer wall 20 in a manner wherein the ribs 75 act as flow obstructions for further deflecting and mixing the exhaust gas with respect to the height direction, which further improves the heat exchange efficiency of the heat exchanger element 110. Lastly, the alternating pattern of the ribs 75 projecting from the first portion 21 and then the second portion 22 of the outer wall 20 causes the exhaust gas to repeatedly flow back and forth with respect to the height direction as the exhaust gas is continuously deflected by the ribs 75 projecting from opposing surfaces of the outer wall 20, which once again further promotes beneficial fluid mixing.

Figure 6:
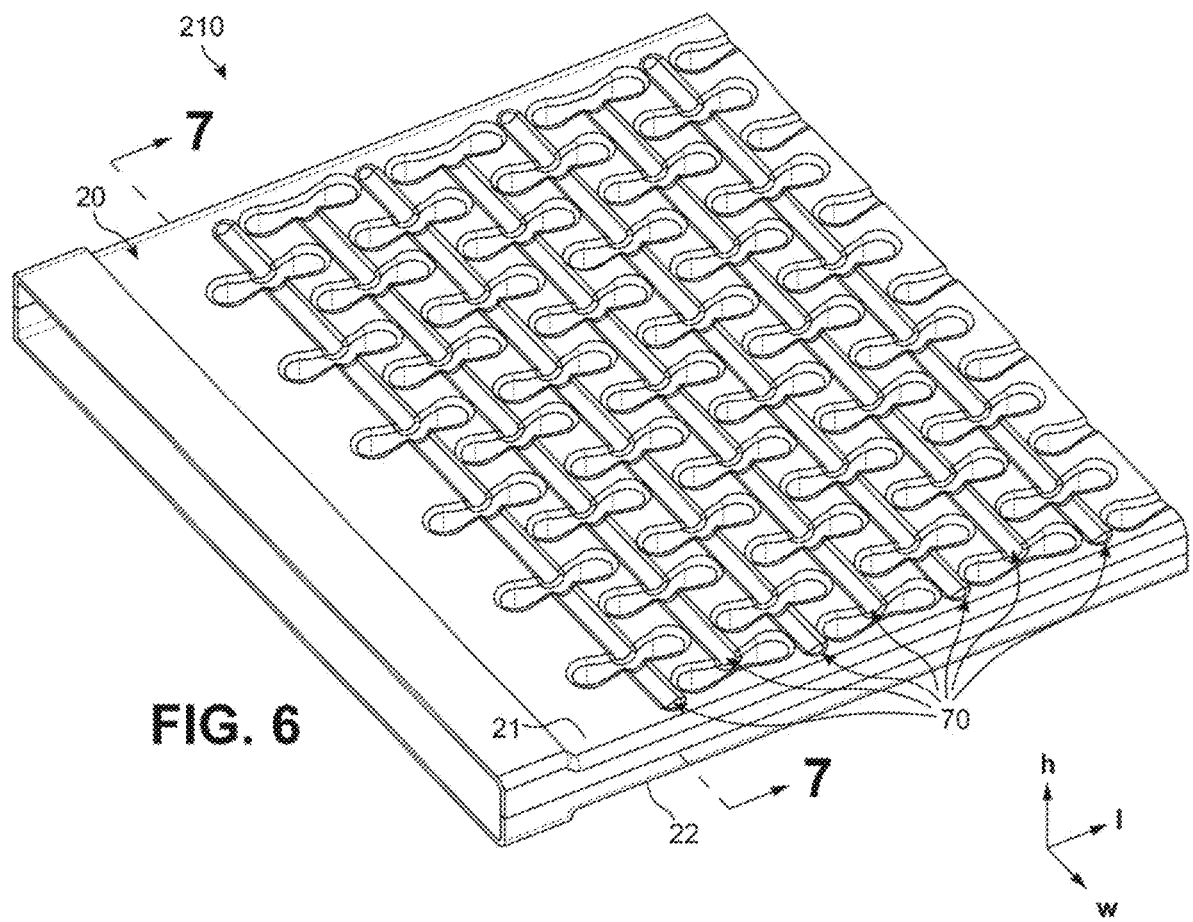
FIG. 6 is an enlarged fragmentary perspective view of a heat exchanger element having a plurality of grooves formed in an outer wall thereof according to another embodiment of the present invention.
Figure 7:
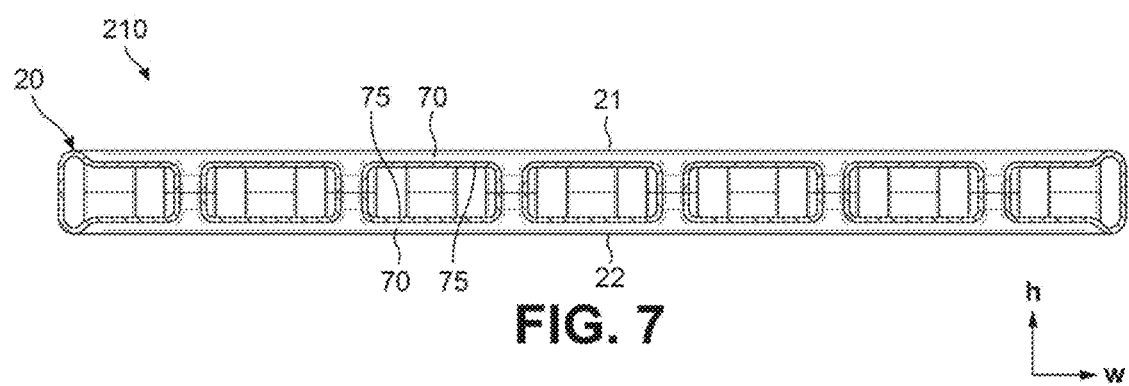
FIG. 7 is an cross-sectional elevational view of the heat exchanger element as taken through section lines 7-7 of FIG. 6.

Referring now to FIGS. 6 and 7, a heat exchanger element 210 according to another embodiment of the present invention is disclosed. The heat exchanger element 210 is substantially identical to the heat exchanger element 110 except the grooves/ribs 70, 75 are formed at each of the first portion 21 and the second portion 22 of the outer wall 20 with respect to each row of the fin structures 40. The configuration illustrated in FIGS. 6 and 7 may be utilized when it is desired to maximize the heat exchange efficiency of the heat exchanger 1 at the expense of obstructing the flow of each of the heat exchanging fluids such that the pressure of each of the heat exchanging fluids is reduced.

It should also be clear to one of skill in the art that the different configurations of the grooves/ribs 70, 75 as illustrated throughout FIGS. 4-7 may be combined or otherwise modified to prescribe any desired flow configuration through and around the corresponding heat exchanger element. For example, the grooves/ribs 70, 75 may be disposed at any desired interval and may be alternated between the opposing first and second portions 21, 22 of the outer wall 20 at any desired frequency, as desired, while remaining within the scope of the present invention.

Figure 8:
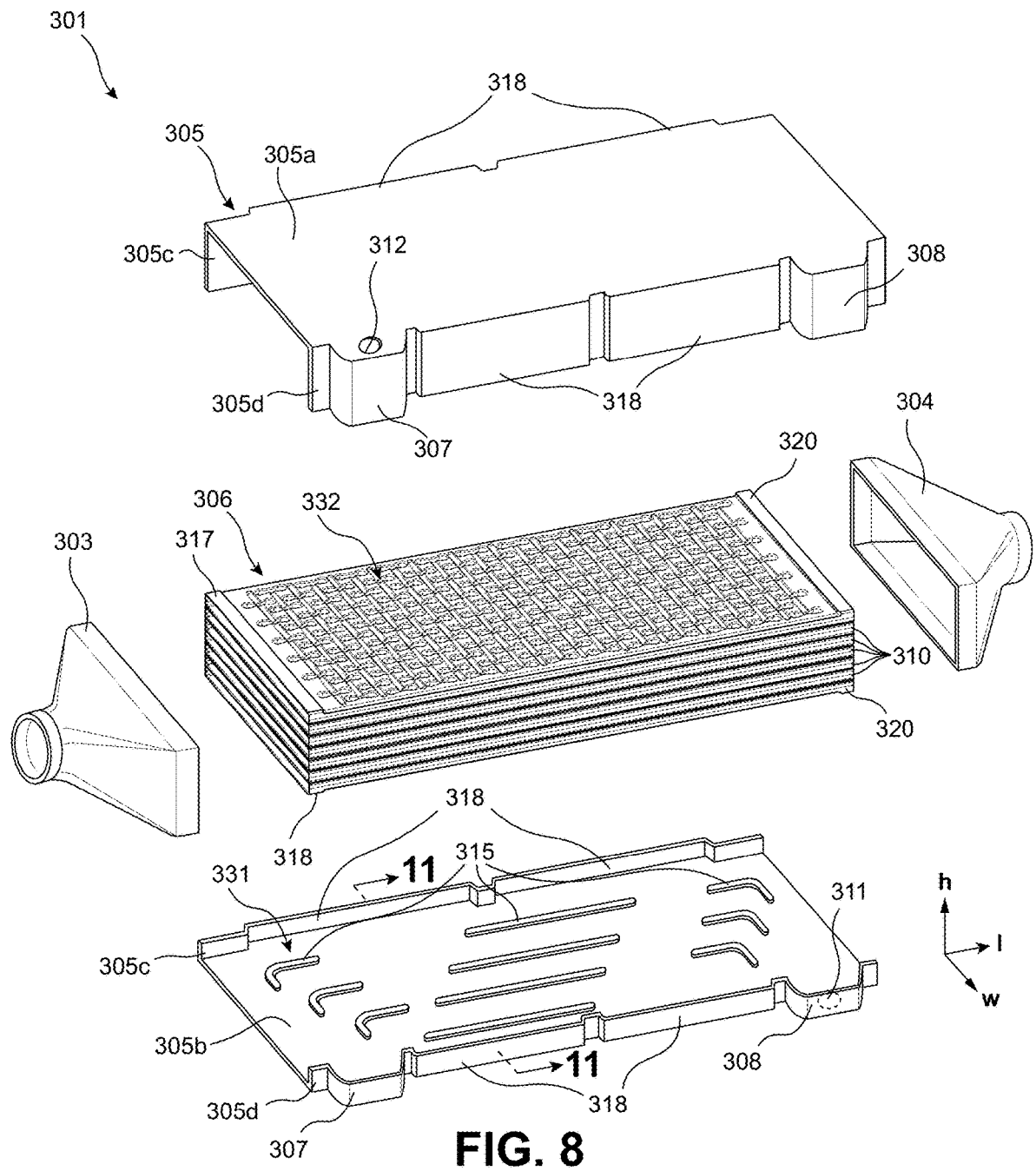
FIG. 8 is an exploded perspective view of a heat exchanger according to another embodiment of the present invention.

Referring now to FIG. 8, a heat exchanger 301 according to another embodiment of the invention is disclosed. The heat exchanger 301 includes a modified core housing 305 as well as a modified heat exchanger core 306. The core housing 305 is configured for coupling to each of an inlet adapter 303 and an outlet adapter 304 in the same manner as disclosed with reference to the heat exchanger 1. The core housing 305 includes a first wall 305a, second wall 305b, third wall 305c, and a fourth wall 305d having substantially the same configuration as the walls 5a, 5b, 5c, 5d of the core housing 5 illustrated in FIG. 1. The core housing 305 further includes a projecting portion 307 formed adjacent the inlet adapter 303 as well as a projecting portion 308 formed adjacent the outlet adapter 304, wherein the projecting portions 307, 308 once again form manifold chambers for distributing or recombining the coolant when entering or exiting the core housing 305. Specifically, the projecting portion 307 forms a manifold chamber for distributing the coolant throughout the heat exchanger core 306 after entering through an inlet opening 311 formed in a lower portion of the projecting portion 307 corresponding to an extension of the second wall 305b while the projecting portion 308 forms a manifold chamber for recombining the coolant before expelling the coolant through an outlet opening 312 formed in an upper portion of the projecting portion 308 corresponding to an extension of the first wall 305a.

The core housing 305 differs from the core housing 5 in that the projecting portions 307, 308 are each formed in a common side of the core housing 5 corresponding to the fourth wall 305d. In order to ensure proper circulation of the coolant throughout the entirety of the heat exchanger core 306, the inner surfaces of the first wall 305a and the second wall 305b may include flow directing elements 315 for prescribing a desired flow of the coolant within the spaces formed between the heat exchanger core 306 and each of the first wall 305a and the second wall 305b, respectively. Specifically, the flow directing elements 315 are configured to direct the coolant to flow towards the opposing third wall 305c in the width direction of the heat exchanger 301 when exiting the inlet opening 311, redirect the coolant to flow in the longitudinal direction of the heat exchanger 301, and then once again redirect the coolant to flow back towards the fourth wall 305d while flowing towards the outlet opening 312. The flow directing elements 315 are shown as including substantially rectilinear elements as well as substantially L-shaped elements, but any desired shape and configuration of the flow directing elements 315 may be utilized for prescribing the flow of the coolant through the core housing 305 without necessarily departing from the scope of the present invention.

The core housing 305 is further differentiated from the core housing 5 by the inclusion of lateral communication chambers 318 formed in each of the third wall 305c and the fourth wall 305d. The lateral communication chambers 318 perform a similar function to the projecting portions 307, 308 in that the coolant may flow past the lateral sides of the heat exchanger core 306 while flowing in the height direction of the heat exchanger 301. Each of the lateral communication chambers 318 accordingly provides fluid communication between a first space 331 provided between a lower portion of the heat exchanger core 306 and the second wall 305b and a second space 332 provided between an upper portion of the heat exchanger core 306 and the first wall 305a. The lateral communication chambers 318 also allow for heat exchanger to take place between a lateral surface of the heat exchanger core 306 and the coolant, thereby increasing the surface area of the heat exchanger core 306 placed in heat exchange relationship with the coolant. The core housing 305 is shown as including a pair of the lateral communications chambers 318 spaced in the longitudinal direction with respect to each of the third wall 305c and the fourth wall 305d, but any number of the lateral communication chambers 318 may be utilized with any desired longitudinal spacing therebetween without necessarily departing from the scope of the present invention.

As can be seen in FIG. 8, the heat exchanger core 306 differs from the heat exchanger core 6 in that the heat exchanger core 306 includes two different types of heat exchanger elements rather than utilizing a repeating arrangement of substantially identical heat exchanger elements 10, 110, 210 stacked on top of one another. Specifically, the heat exchanger core 306 includes a plurality of inner heat exchanger elements 310 sandwiched between a pair of outer heat exchanger elements 320.

Figure 9:
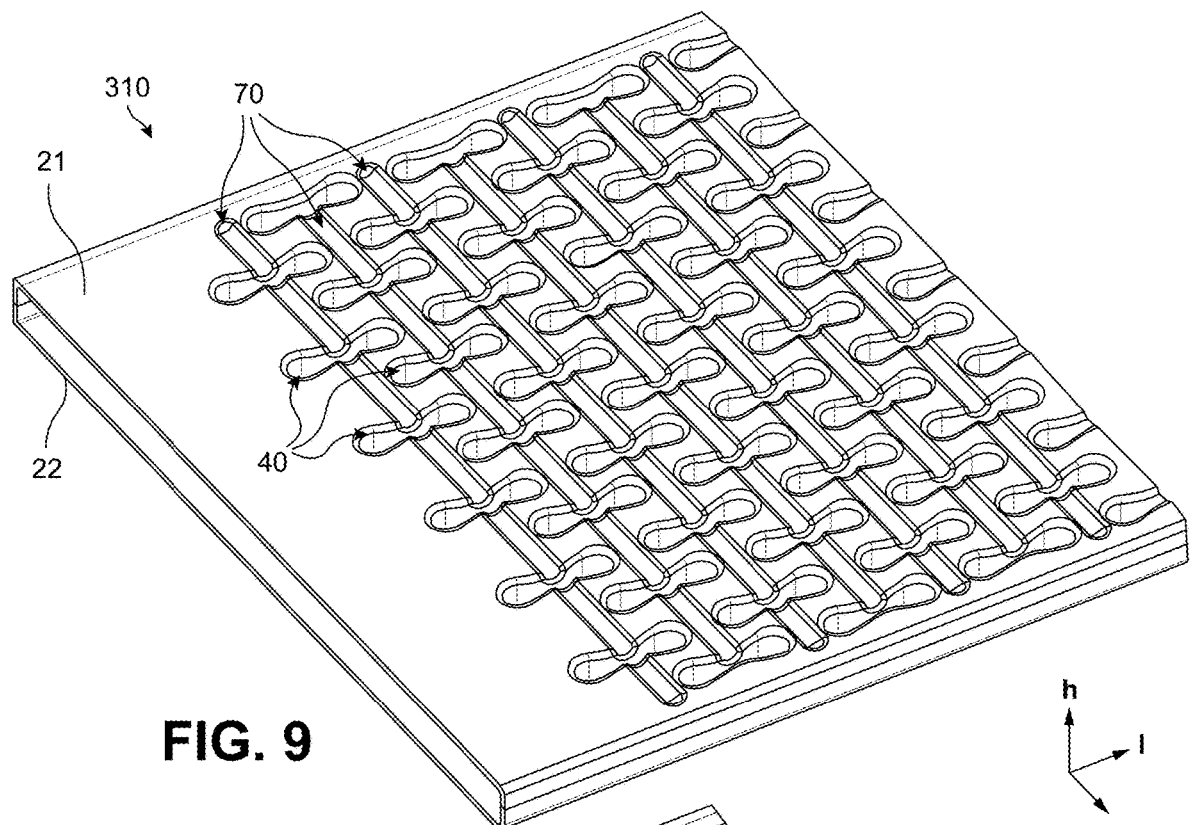
FIG. 9 is a perspective view of an inner heat exchanger element used to form a heat exchanger core of the heat exchanger of FIG. 8.

As can be seen in FIG. 9, the inner heat exchanger elements 310 are substantially similar to the heat exchanger elements 210 as disclosed in FIGS. 6 and 7 including the same general configuration of the fin structures 40 and the grooves/ribs 70, 75 formed therein. The inner heat exchanger elements 310 differ from the heat exchanger elements 210 in that each of the ends of each of the inner heat exchanger elements 310 is formed devoid of one of the outwardly projecting coupling features 16 formed by the outwardly projected coupling surfaces 17, 18. Instead, the first portion 21 and the second portion 22 of each of the inner heat exchanger elements 310 are arranged as substantially planar along an entirety of the length of each of the inner heat exchanger elements 310.

Figure 10:
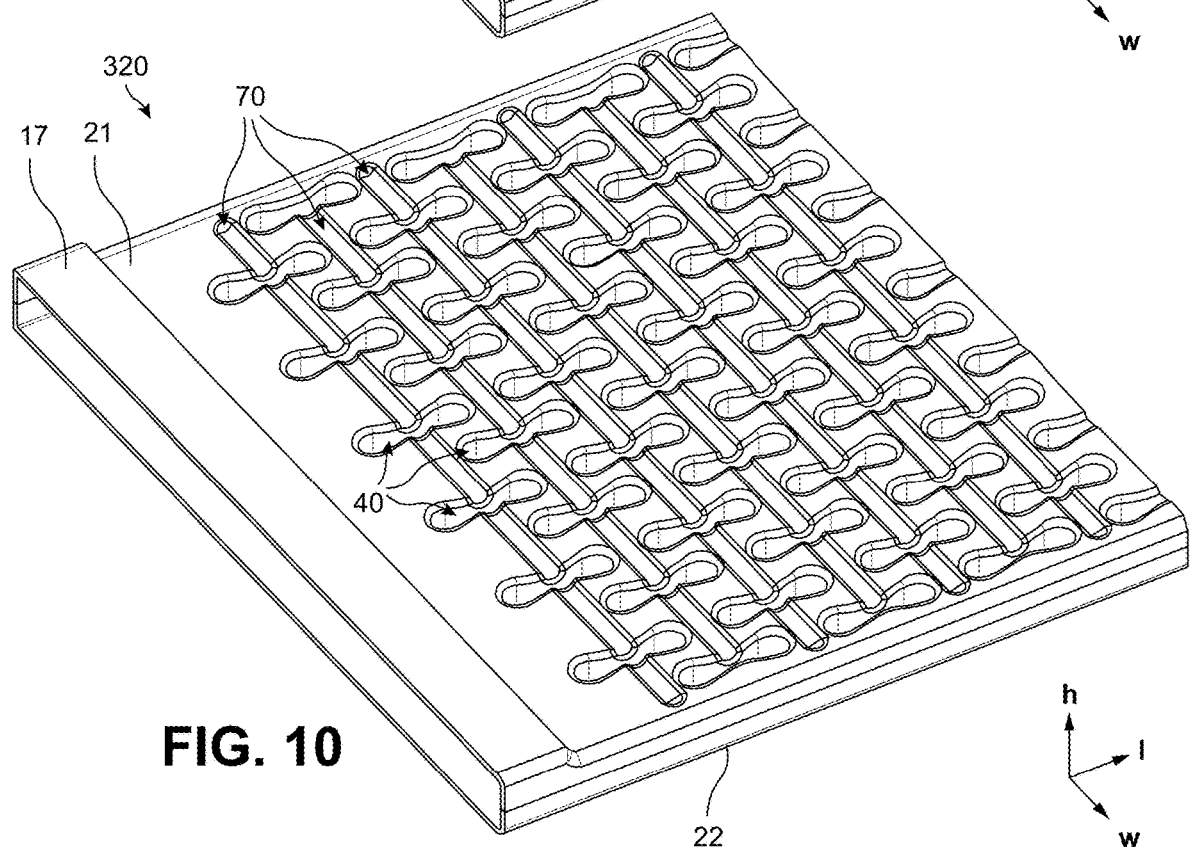
FIG. 10 is a perspective view of an outer heat exchanger element used to form the heat exchanger core of the heat exchanger of FIG. 8.
Figure 11:
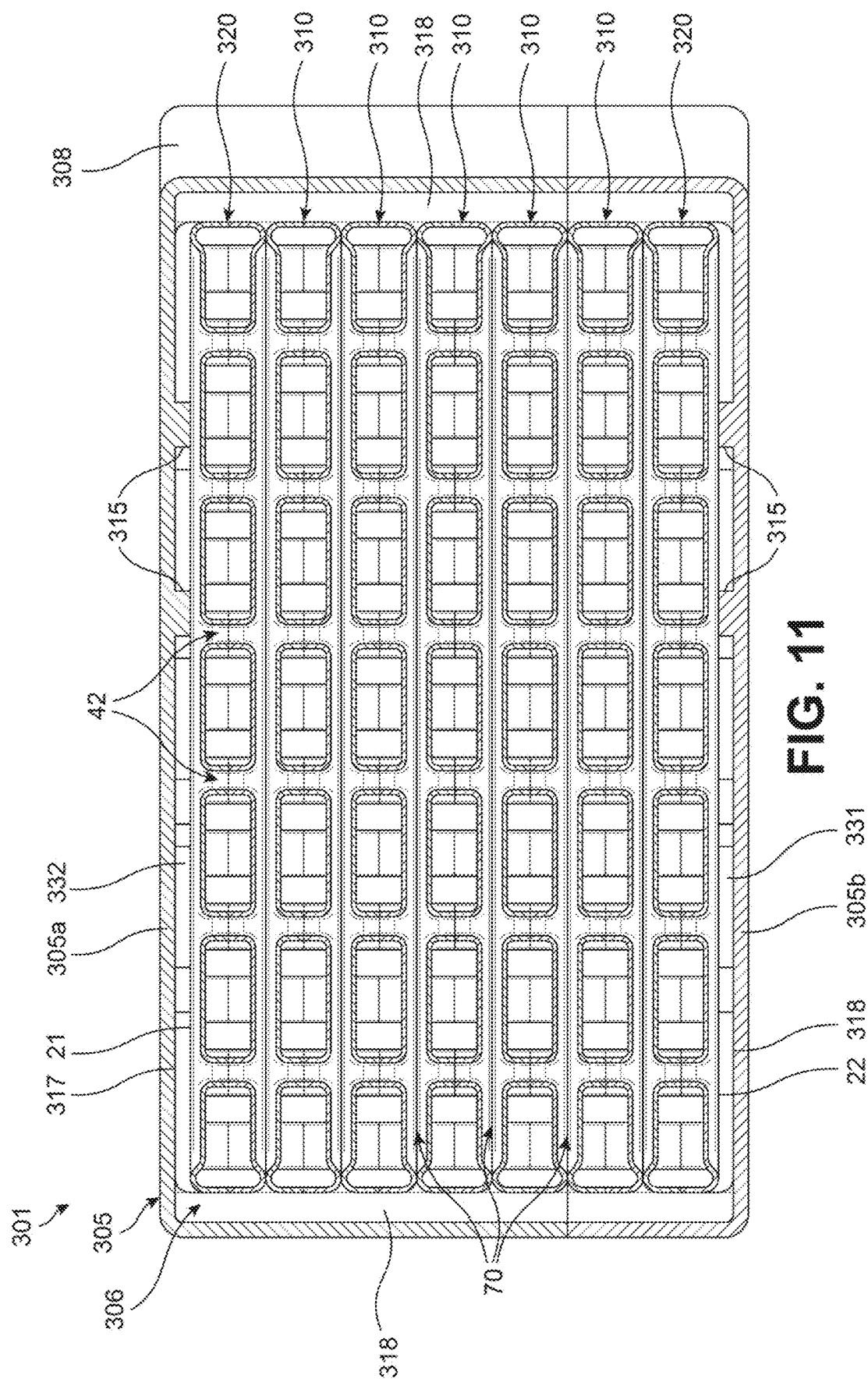
FIG. 11 is a cross-sectional elevational view of the heat exchanger of FIG. 8 when in an assembled configuration from the perspective of section lines 11-11 of FIG. 8.

As shown in FIG. 10, the outer heat exchanger elements 320 are also substantially similar to the heat exchanger elements 210, but differ by including only one outwardly projecting spacing surface 317, 318 at each end of each of the outer heat exchanger elements 320, wherein each of the spacing surfaces 317, 318 is similar in structure to the aforementioned coupling surfaces 17, 18. The outer heat exchanger elements 320 accordingly include only one of the spacing surfaces 317, 318 offset in the height direction from one of the first portion 21 or the second portion 22 of the outer heat exchanger elements 320. For example, as can be seen in FIGS. 8 and 11, the outer heat exchanger element 320 adjacent the first wall 305a includes the spacing surface 317 projecting away from the first portion 21 thereof in order to form the second space 332 between the first portion 21 and the first wall 305a while the outer heat exchanger element 320 adjacent the second wall 305b includes the spacing surface 318 projecting away from the second portion 22 thereof in order to form the first space 331 between the second portion 22 and the second wall 305b. The first space 331 accordingly acts as a manifold chamber at a lower portion of the core housing 305 for distributing the coolant to the flow channels 42 while the second space 332 acts as a manifold chamber for recombining the coolant after having passed through the flow channels 42 within an interior of the heat exchanger core 306.

The inner and outer heat exchanger elements 310, 320 are formed in similar fashion to the heat exchanger elements 10, 110, 210, wherein two plate-like structures are joined along a seam by an aggressive joining process such as brazing. Additionally, the heat exchanger core 306 may also be formed by a similar aggressive joining process such as brazing, wherein a planar outer surface of the second portion 22 of one of the heat exchanger elements 310, 320 is coupled directly to a planar outer surface of the first portion 21 of an adjacent one of the heat exchanger elements 310, 320.

The heat exchanger 301 operates as follows. The exhaust gases are caused to flow through the heat exchanger core 306 while flowing in a direction from the inlet adapter 303 to the outlet adapter 304. Concurrently, the coolant is introduced into the interior of core housing 305 through the inlet opening 311 formed in the projecting portion 308. The coolant is then distributed to the first space 331 where the flow is directed therethrough by the flow directing elements 315. The coolant is then able to flow upwardly through the flow channels 42 formed within the fin structures 40 as well as laterally through each of the adjoining grooves 70. The grooves 70 of the heat exchanger elements 310, 320 of FIGS. 8-11 essentially replace the spaces formed between adjacent ones of the heat exchanger elements 10, 110, 210 of FIGS. 1-7 for ensuring that a desired heat exchange interface is established between the coolant and the exhaust gases. The coolant is also able to flow around the lateral portions of the heat exchanger core 306 via the lateral communications chambers 318. The coolant flowing through the flow channels 42 and the lateral communications chambers 318 is then able to be recombined within the second space 332 before being directed by the flow directing elements 315 towards the outlet opening 312 of the projecting portion 307, whereby the coolant exits the core housing 305.

The coolant and the exhaust gases have either of a counter flow relationship or a cross-flow relationship when passing through the heat exchanger core 306 in similar fashion to the heat exchanger 1. However, the disclosed flow configurations may be altered without necessarily departing from the scope of the present invention. For example, the direction of flow of the exhaust gases through the heat exchanger core 306 may be reversed to result in a flow configuration that is a combination of parallel flow and cross flow, as desired.

It should also be understood that any of the configurations of the fin structures 40 and the grooves/ribs 70, 75 shown and described with reference to any of the disclosed embodiments may be used for forming the inner and outer heat exchanger elements 310, 320. For example, the number and frequency of each of the mentioned features may be selected to impart a desired heat exchange efficiency or capacity onto the heat exchanger core 306, as desired.

Lastly, it should be understood by one skilled in the art that the heat exchanger cores 6, 306 and the core housings 5, 305 may be provided substantially interchangeably without significantly altering the operation of either disclosed heat exchanger 1, 301, hence any combination of the disclosed features thereof may be utilized while remaining within the scope of the present invention. For example, the core housing 5 may be modified to include the lateral communication chambers 318, the flow directing elements 315, and an alternative position of one or both of the openings 11, 12 while still appreciating the beneficial features provided by the novel structure of each of the disclosed heat exchanger elements 10, 110, 210, 310, 320.

Accordingly, from the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A heat exchanger element comprising:
an outer wall formed into a tubular shape, the outer wall including a first portion and a second portion, the first portion arranged parallel to and spaced apart from the second portion; and
a plurality of fin structures extending between the first portion and the second portion of the outer wall, each of the fin structures defining a flow channel, wherein each of the fin structures has a dumb-bell shaped cross-section, wherein the plurality of the fin structures is arranged into a plurality of rows of the fin structures, wherein a groove is formed in an outer surface of one of the first portion or the second portion of the outer wall, and wherein the groove intersects each of the fin structures of one of the rows of the fin structures.

2. The heat exchanger element of claim 1, wherein each of the flow channels provides fluid communication between an outer surface of the first portion of the outer wall and an outer surface of the second portion of the outer wall.

3. The heat exchanger element of claim 1, wherein each end of each of the fin structures includes a transition region, each of the transition regions connecting an outer surface of the outer wall to an inner surface of a corresponding one of the fin structures defining the flow channel therethrough.

4. The heat exchanger element of claim 1, wherein each of the flow channels provides fluid communication between a groove formed in an outer surface of the first portion of the outer wall and a groove formed in an outer surface of the second portion of the outer wall.

5. The heat exchanger element of claim 1, wherein the heat exchanger element is formed by cooperation of a first plate element including the first portion of the outer wall and a second plate element including the second portion of the outer wall.

6. The heat exchanger element of claim 5, wherein each of the fin structures is formed by cooperation of a first projecting rim projecting from the first plate element and a second projecting rim projecting from the second plate element.

7. The heat exchanger element of claim 5, wherein the outer wall further includes a third portion and an oppositely arranged fourth portion, wherein the third portion and the fourth portion of the outer wall are each partially formed by each of the first plate element and the second plate element.

8. The heat exchanger element of claim 1, wherein each of the rows of the fin structures extends in a width direction of the heat exchanger element and wherein the fin structures of each of the rows are at least partially overlapped with the fin structures of an adjacent one of the rows with respect to a longitudinal direction of the heat exchanger element.

9. The heat exchanger element of claim 1, wherein adjacent rows of the fin structures are alternatingly offset in a width direction of the heat exchanger element when progressing in the longitudinal direction of the heat exchanger element.

10. The heat exchanger element of claim 1, wherein a plurality of the grooves are formed in the outer wall with each of the grooves intersecting each of the fin structures of a corresponding row of the fin structures, wherein adjacent rows of the fin structures include the grooves alternatingly formed in the first portion and the second portion of the outer wall when progressing in the longitudinal direction of the heat exchanger element.

11. The heat exchanger element of claim 1, wherein an inwardly projecting rib corresponding to the groove is formed on an inner surface of one of the first portion or the second portion of the outer wall.

12. The heat exchanger element of claim 1, wherein an end of the heat exchanger element includes a first surface spaced outwardly from the first portion of the outer wall with respect to a height direction of the heat exchanger element.

13. The heat exchanger element of claim 1, wherein a first fluid is configured to flow through the tubular shape formed by the outer wall, and wherein a second fluid is configured to flow through each of the flow channels of the fin structures.

14. A heat exchanger comprising:
a housing configured to delimit the flow of a first fluid; and
a plurality of heat exchangers elements disposed within the housing, each of the heat exchanger elements including:
an outer wall formed into a tubular shape configured to receive a second fluid therethrough, the outer wall including a first portion and a second portion, the first portion arranged parallel to and spaced apart from the second portion; and
a plurality of fin structures extending between the first portion and the second portion of the outer wall, each of the fin structures defining a flow channel configured to receive a flow of the first fluid, wherein each of the fin structures has a dumb-bell shaped cross-section, wherein the plurality of the fin structures is arranged into a plurality of rows of the fin structures, wherein a groove is formed in an outer surface of one of the first portion or the second portion of the outer wall, and wherein the groove intersects each of the fin structures of one of the rows of the fin structures.

15. The heat exchanger according to claim 14, wherein the first fluid is a coolant and the second fluid is an exhaust gas of an internal combustion engine.

16. The heat exchanger according to claim 14, wherein a first flow space is formed between the first portion of the outer wall of a first one of the heat exchanger elements and the second portion of the outer wall of a second one of the heat exchanger elements, and wherein a second flow space is formed between the second portion of the outer wall of the first one of the heat exchanger elements and the first portion of the outer wall of a third one of the heat exchanger elements, wherein the flow channels of the first one of the heat exchanger elements provides fluid communication between the first flow space and the second flow space.

17. The heat exchanger according to claim 14, wherein the housing includes an inlet opening configured to introduce the first fluid into an interior of the housing and an outlet opening configured to remove the first fluid from the interior of the housing, wherein the inlet opening is disposed adjacent an outlet end of each of the heat exchanger elements and wherein the outlet opening is disposed adjacent an inlet end of each of the heat exchanger elements.

* * * * *